(No Model.)
W. LOREY.
FILTER.
No. 538,875. Patented May 7, 1895.
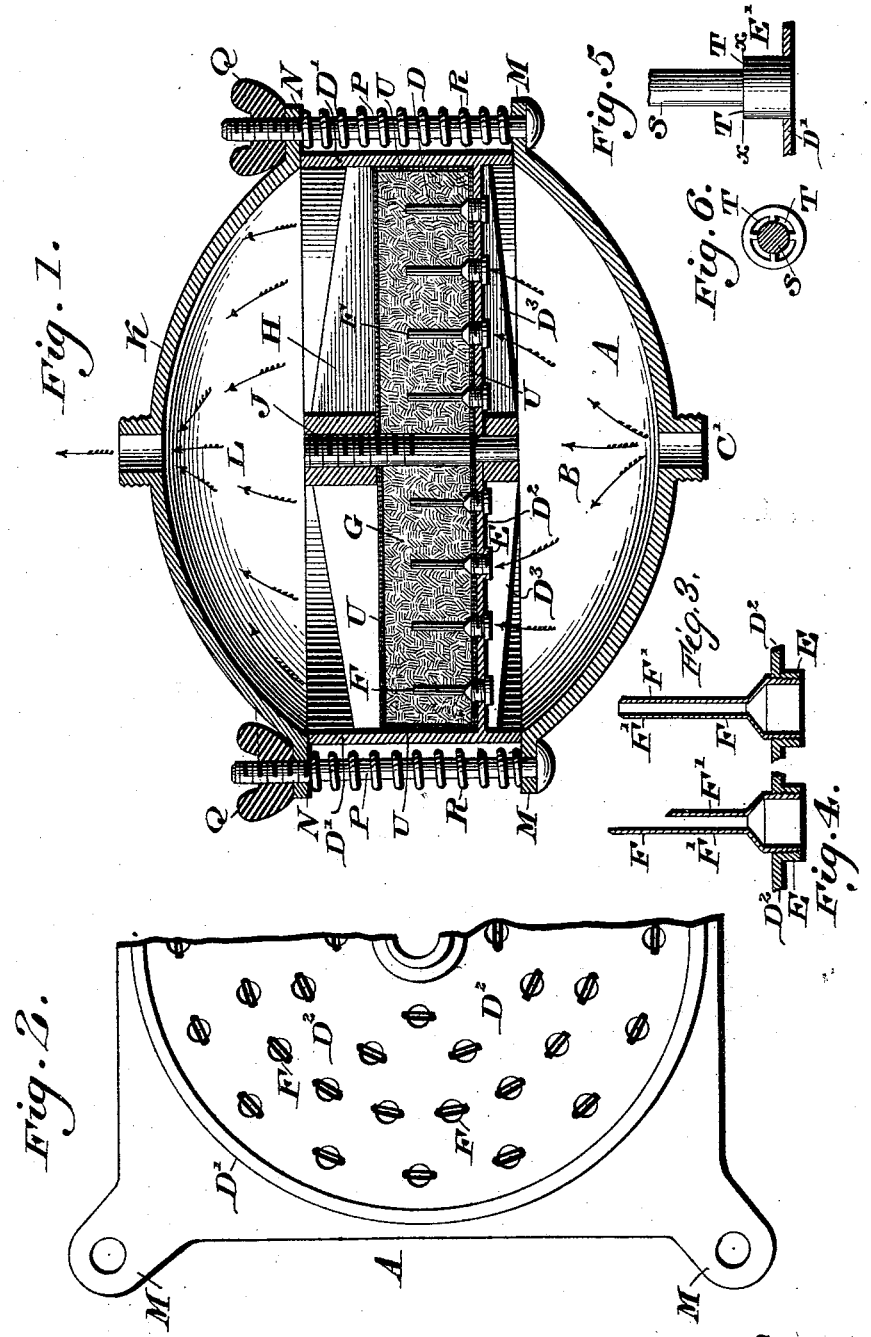

UNITED STATES PATENT OFFICE.

WILLIAM LOREY, OF PHILADELPHIA, PENNSYLVANIA, ASSIGNOR OF TWO-THIRDS TO HENRY GUENTHER, OF SAME PLACE.

FILTER.

SPECIFICATION forming part of Letters Patent No. 538,875, dated May 7, 1895.

Application filed June 19, 1894. Serial No. 515,009. (No model.)

*To all whom it may concern:*

Be it known that I, WILLIAM LOREY, a citizen of the United States, residing in the city and county of Philadelphia, State of Pennsylvania, have invented a new and useful Improvement in Filters, which improvement is fully set forth in the following specification and accompanying drawings.

My invention consists of a filter having a novel filtering chamber, and other features, as will be set forth and pointed out in the claims that follow the specification.

Figure 1 represents a vertical section of a filter embodying my invention. Fig. 2 represents a top or plan view of a portion of the interior thereof. Figs. 3, 4, and 5 represent forms of guides for directing the fluid from the receiving-chamber into the filtering material. Fig. 6 represents a section on line $x$ $x$, Fig. 5.

Similar letters of reference indicate corresponding parts in the several figures.

Referring to the drawings: A designates the base plate of the filter, the same being depressed forming the receiving chamber B, which is provided with the inlet pipe C. Supported on the rim of said base is the filtering chamber D, which consists of the wall D' and bottom $D^2$ which latter is formed with bosses E to which are screwed or otherwise attached the guides F, which are in communication with the receiving chamber B and said filtering chamber D.

G designates the filtering material, which fills the chamber D, and incloses the guides F. On said material is an open follower or spider H, which has a hub centrally therein, the same being internally-threaded and fitted on the screw J, which rises from and is secured to the bottom $D^2$ of the filter-chamber and passes through said chamber.

K designates the cap of the filter, the same being located above the follower H, and resting on the wall of the chamber D, it being noticed that a chamber L exists between said parts for the reception of the filtered fluid.

On the base plate are ears M, and on the cap K are ears N, said ears coinciding and receiving the bolts P, which are provided with nuts Q for clamping the base plate and cap against the filtering chamber, and firmly connecting said parts.

Interposed between the base plate and cap, and in the present case encircling the bolts P, are coiled springs R, which are compressed when the nuts Q are tightened, so that when the filter is to be dismembered, said nuts are unscrewed, and the springs separate the cap and base plate from the filtering chamber, whereby when the cap is displaced, said chamber may be removed, a feature of importance when the latter requires cleansing, or the filtering material is to be replenished or refreshed. In this case, another chamber supplied with filtering material is substituted for the one removed, after which the cap and bolts are restored, the nuts applied and tightened, and thus the filter is again in effective condition.

The guides F are designed to direct fluid from the chamber B into the filtering material G, and as shown in Figs. 3 and 4, are of the form of separated plates F', F', between which the fluid is directed, and they are sufficiently elastic so as to separate when the fluid flows between the same, thus spreading apart the filtering material which incloses said guides, so that the fluid may readily enter said material.

In Fig. 5, rods S are substituted for the plates F', F', and openings or ports T are formed in the bosses E', around the lower ends of said rods, so that the fluid enters the filtering material through said ports, and is guided upwardly along said rods S, thus in either case preventing packing of the material around the means provided as inlets for the fluid into said material, or into the filtering chamber.

The filtering material is contained in a sack or bag U within the chamber D, the same having openings in its bottom for the passage therethrough of the guides, it being evident that after the fluid has passed through the filtering material, it escapes through the sack or bag, and so enters in filtered condition into the chamber L.

In practice, the wall and bottom of the chamber D are formed integral of metal, and said bottom has ribs $D^3$ on its under side for strengthening purposes, it being evident that the chamber may be removed in its entirety from the base plate and cap. The sack or bag affords ready and convenient means for the removal of the filtering material, as the latter may be bodily withdrawn from the chamber by said sack or bag.

Having thus described my invention, what I claim as new, and desire to secure by Letters Patent, is—

1. A filter having a filtering chamber, a chambered cap, a chambered base plate, bolts passing through ears on said cap and base plate, a screw rising from the bottom of said filtering chamber, and an open follower working on said screw, said filtering chamber being supported on the rim of the base plate and having its wall and bottom integral, said parts being combined substantially as described.

2. In a filter, a filtering chamber having inlets for the fluid to be filtered, filtering material in said chamber, and elastic fluid guides extending from said inlets into said material, substantially as described.

3. In a filter, having a separable filtering chamber, filtering material in combination with a sack containing the same and guides passing into said sack from openings in the base of said chamber, said sack being adapted to be fitted in said filtering chamber which is in communication with the fluid-receiving chamber, substantially as set forth.

4. A filter having a depressed base plate and a raised cap, a filtering chamber, a sack in said filtering chamber containing filtering material, the bottom of said filtering chamber having openings with guides extending therefrom into said sack, and an open follower bearing on said sack, said cap having an outlet, said parts being combined substantially as described.

WILLIAM LOREY.

Witnesses:
JOHN A. WIEDERSHEIM,
R. H. GRAESER.